US006941395B1

(12) United States Patent
Galang et al.

(10) Patent No.: US 6,941,395 B1
(45) Date of Patent: Sep. 6, 2005

(54) DVI CABLE INTERFACE

(75) Inventors: Einstein C. Galang, Daly City, CA (US); Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 26 days.

(21) Appl. No.: 10/254,485

(22) Filed: Sep. 24, 2002

(51) Int. Cl.[7] .............................................. G06F 13/12
(52) U.S. Cl. ..................... 710/65; 174/113 R
(58) Field of Search ............................. 710/65, 70, 71, 710/72, 62, 2; 341/50; 345/204, 212; 439/362; 174/113 R

(56) References Cited

U.S. PATENT DOCUMENTS 5,729,607 A * 3/1998 DeFries et al. ............. 380/263
6,178,217 B1 * 1/2001 Defries et al. .............. 375/377
6,577,303 B2 * 6/2003 Kim ........................... 345/212
6,597,411 B1 * 7/2003 Selby et al. ................ 348/806
2004/0136456 A1 * 7/2004 Ogden .................... 375/240.01

OTHER PUBLICATIONS

RAM Electronics Industries Inc., 7980 National Highway, Pennsauken, NJ 08110, DVI Cables-DVI Video Cards-DVI Info, 10 pages.

* cited by examiner

Primary Examiner—Kim Huynh
Assistant Examiner—Harold Kim
(74) Attorney, Agent, or Firm—LaRiviere, Grubman & Payne, LLP

(57) ABSTRACT

A method and apparatus for transmitting a DVI signal (1) to a remote location (7). The method splits (3) the signal into a multitude of signals that are transmitted down cables (4). The split signals are collected (5) into a single signal at the receiving end at the remote location (7). An apparatus for splitting (3) the signals and collecting (5) the split signals is illustrated.

9 Claims, 2 Drawing Sheets

DVI CABLE INTERFACE

TECHNICAL FIELD

This invention relates to interfaces for electrical devices. In particular, the invention relates to cable to Digital Visual Interface (DVI) for use with digital display devices. With still greater particularity, the invention relates to interconnect boards for connecting a DVI interface to multiple cables.

A portion of the disclosure of this patent document contains material which is subject to (copyright or mask work) protection. The (copyright or mask work) owner has no objection to the facsimile reproduction by any one of the patent disclosure, as it appears in the Patent and Trademark Office patent files or records, but otherwise reserves all (copyright or mask work) rights whatsoever.

BACKGROUND ART

The Digital Visual Interface (DVI) is a display interface developed in response to the proliferation of digital flat-panel displays. The DVI interface is becoming more prevalent and is expected to become widely used for digital display devices, including flat-panel displays and emerging digital CRTs. The digital DVI connector has 24 pins that can accommodate up to two TMDS links and the VESA DDC and EDID services. The DVI specification defines two types of connectors. The standard DVI cable attachable to the connector is a 24-conductor cable. DVI cables are expensive and cannot be used for great lengths. The longest commercially available DVI cable is sixteen feet in length (16').

The only available alternative to use of DVI cables is double digital analog conversion. The digital signal from the computer must be converted to an analog signal for the analog VGA interface, then converted back to a digital signal for processing by the flat-panel display. This inherently inefficient process takes a toll on performance and video quality and adds cost. In contrast, when a display is directly connected to a digital interface, digital-to-analog conversion is not required.

A suitable DVI cable arrangement is an essential element of a new generation of electronic devices including digital television, High Definition Television (HDTV) and large data monitors. Such devices will need long cables as the display is often removed from the electronics.

DISCLOSURE OF THE INVENTION

A problem has arisen in DVI technology where a digital signal is required to traverse a long distance. The bandwidth required to display SXGA is 83 MHZ. If a greater resolution, such as for HDTV, is desired, the bandwidth requirement will be correspondingly larger. If standard 24-conductor cable is used, the crosstalk and radiation along with capacitive degradation of signal making the use of long length DVI cables untenable. Accordingly, there is a long-standing demand for DVI cable system capable of long length and reasonable cost.

The invention makes extensive use of existing time proven cabling methods. A standard DVI interface connector of one gender is connected to a custom connector card. The card connects the 24 output connections of the interface to a plurality of twisted pair cables. A similar card connects the twisted pair cables to a DVI connector of the opposite gender.

The inventions system allows connection of devices such as displays to a remote source such as a television receiver or computer. This is accomplished with time-tested components at minimal cost. The invention may be used to string the twisted pair cables through walls with a converter at each end attachable by DVI pigtail to the components.

BEST MODE FOR CARRYING OUT THE INVENTION

Figure 1:
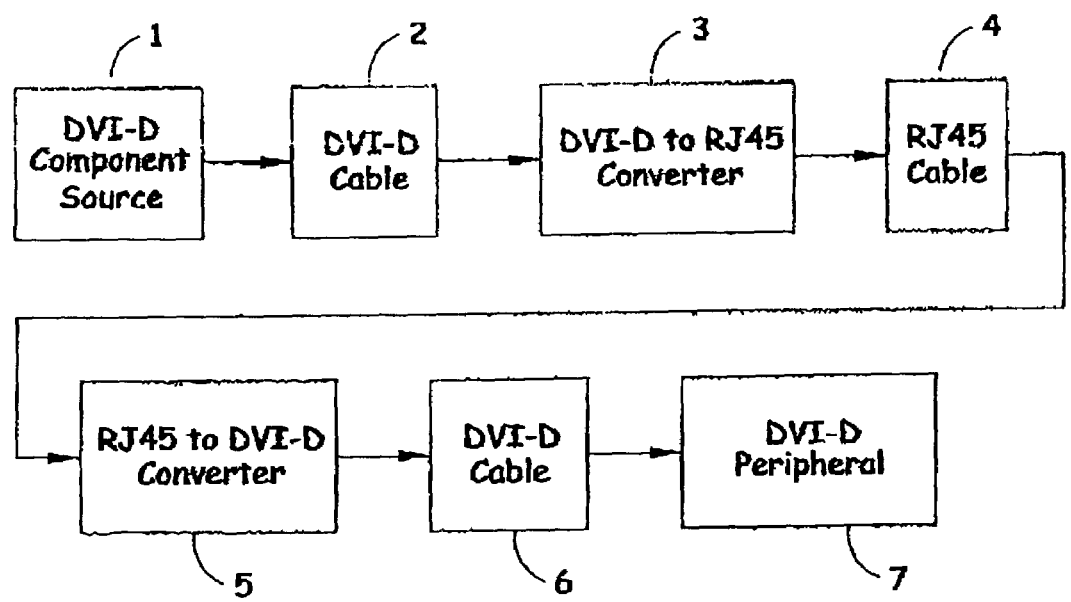
FIG. 1 is a block diagram of the system of the invention.

FIG. 1 is a block diagram of the system of the invention. The component source is the source of the DVI signal. Component source 1 may be a computer, specifically, the video output of a computer. Component source 1 may also be a DVD, player, a television set, or VCR, in short, any thing that is capable of producing a signal under the DVI standard. Component source 1 typically delivers the signal through a standard DVD jack, although a direct connection to a DVI cable is also possible. One end of a DVI cable 2 connects to the output of component source 1. Cable 2 is typically a 24 four-wire cable adapted specifically for transmission of DVI signals. The other end of cable 2 connects to a converter 3. The connection of cable 2 to converter 3 may be done through a DVI plug and DVI jack or may be direct. Converter 3 converts the 24-input signal into a plurality of signals suitable for twisted pair cables. In the preferred embodiment, converter 3 does not include any active components. In the preferred embodiment, converter 3 outputs to three RJ45 jacks. A plurality of twisted pair cables 4 have one end connected to converter 3. In the preferred embodiment, three category 5 cables each having four twisted pairs was used for cables 4. For a greater bandwidth, category 5E or an optimized cable should be used. "110" telephone style punch down blocks should be used instead of the RJ45 connectors as output jacks 37, 38, and 39 if cables 4 uses 20 GA solid conductors which won't fit an RJ45. The other end of cables 4 connect to the input of a second converter 5. In the preferred embodiment, converter 5 is identical to converter 3 reversed. The output of converter 2 connects to a DVI cable 6. DVI cable connects to a peripheral 7. Peripheral 7 may be a video monitor or any device having a DVI input.

Figure 2:
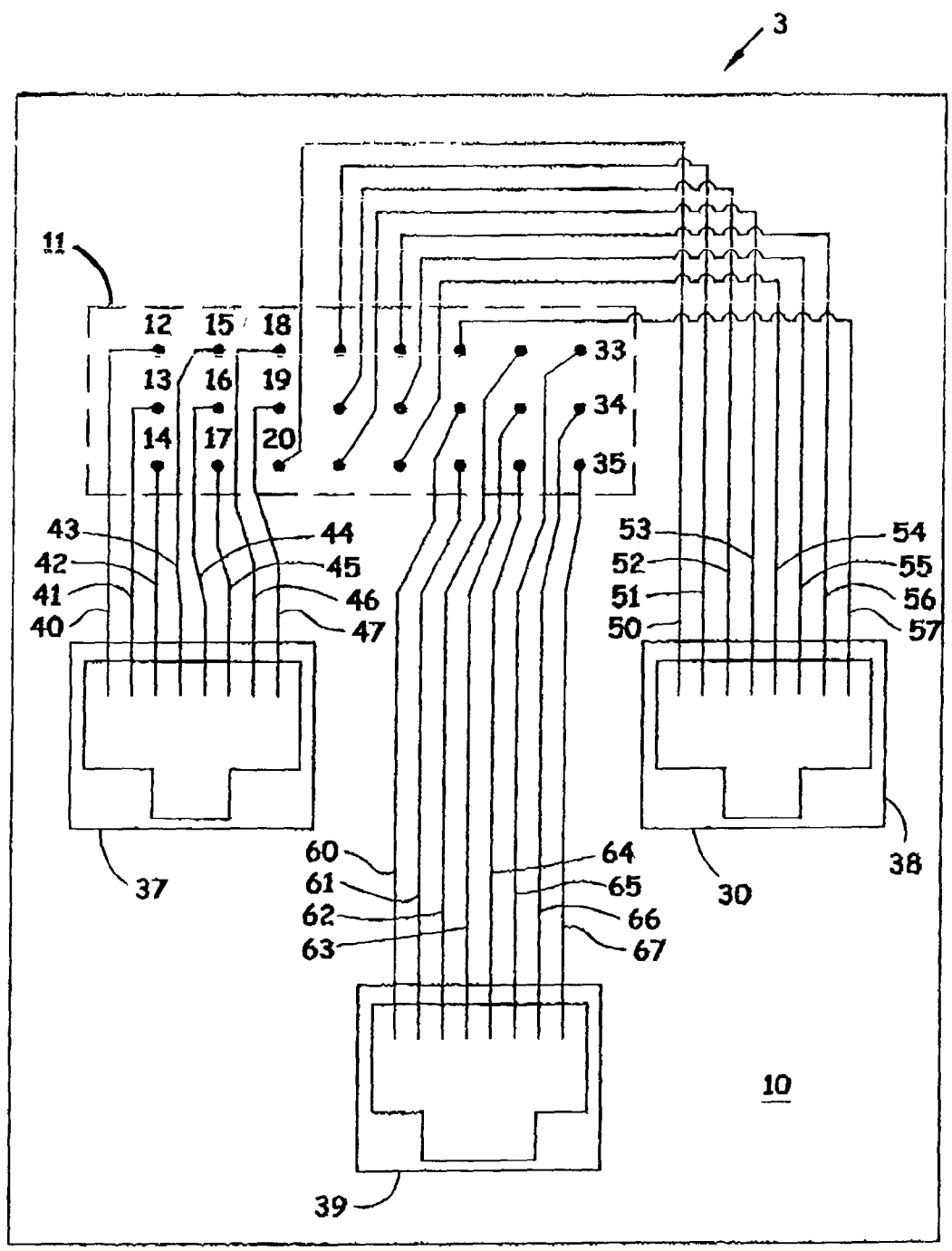
FIG. 2 is a top plan view of converter 3 of the invention.

FIG. 2 is a top plan view of converter 3 of the invention. A printed circuit board 10 forms the body of converter 3. Converter 3 includes a DVI jack 11 mounted to the back side of printed circuit board 10 for inputting a DVI signal. A Molex DVI-D Female Receptacle p#74320-5000 has been found suitable for jack 11 but other equivalent jacks could be used. Jack 11 includes 24 pin recepticles 12–36. Three output jacks 37, 38, and 39 are also mounted to printed circuit board 10 included on converter 3. Molex CAT5 Jack w/internal shield #855070001 have been found suitable for use as output jacks 37, 38, and 39. In particular, "110" telephone style punch down blocks should be used instead of the RJ45 connectors as output jacks 37, 38, and 39 if cables 4 uses 20 GA solid conductors which won't fit an RJ45. Each of output jacks 37, 38, and 39 include 8 pins 40–47, 50–57 and 60–67, respectively. Board 10 connects pin 12 of input DVI jack 11 to pin 40 of output jack 37. The remaining pins are connected as shown in the following table.

Table 1

Jack 37 pin 40 to DVI jack 11 pin 12 T.M.D.S. Data 2−signal
Jack 37 pin 41 to DVI jack 11 pin 13 T.M.D.S. Data 2+signal
Jack 37 pin 42 to DVI jack 11 pin 14 T.M.D.S. Data 2/4 Shield
Jack 37 pin 43 to DVI jack 11 pin 15 T.M.D.S. Data 2−signal
Jack 37 pin 44 to DVI jack 11 pin 16 T.M.D.S. Data 4+signal
Jack 37 pin 45 to DVI jack 11 pin 17 DDC Clock
Jack 37 pin 46 to DVI jack 11 pin 18 DDC Data
Jack 37 pin 47 to DVI jack 11 pin 19 Analog Vertical Sync.
Jack 38 pin 50 to DVI jack 11 pin 20 T.M.D.S. Data 1−signal
Jack 38 pin 51 to DVI jack 11 pin 21 T.M.D.S. Data 1+signal
Jack 38 pin 52 to DVI jack 11 pin 22 T.M.D.S. Data 1/3 Shield
Jack 38 pin 53 to DVI jack 11 pin 23 T.M.D.S. Data 3−signal
Jack 38 pin 54 to DVI jack 11 pin 24 T.M.D.S. Data 3+signal
Jack 38 pin 55 to DVI jack 11 pin 25 +5 volts
Jack 38 pin 56 to DVI jack 11 pin 26 Ground
Jack 38 pin 57 to DVI jack 11 pin 27 Hot plug direct
Jack 39 pin 60 to DVI jack 11 pin 28 T.M.D.S. Data 0−signal
Jack 39 pin 61 to DVI jack 11 pin 29 T.M.D.S. Data 0+signal
Jack 39 pin 62 to DVI jack 11 pin 30 T.M.D.S. Data 0/5 Shield
Jack 39 pin 63 to DVI jack 11 pin 31 T.M.D.S. Data 5−signal
Jack 39 pin 64 to DVI jack 11 pin 32 T.M.D.S. Data 5+signal
Jack 39 pin 65 to DVI jack 11 pin 33 T.M.D.S. Clock shield
Jack 39 pin 66 to DVI jack 11 pin 34 T.M.D.S. Clock +
Jack 39 pin 67 to DVI jack 11 pin 35 T.M.D.S. Clock −

A modified converter 3 may be mounted in a wall socket (not shown) with DVI jack 11 pointing into the room and jacks 37, 38, and 39 directed toward the wall. Long cables 4 running through walls can connect two such converters to allow an unobtrusive remote monitor in a building. DVI cables 2 and 6 are pigtails connecting to source 1 and output 7 respectively.

INDUSTRIAL APPLICABILITY

The present invention may be used to solve problems that have arisen in DVI technology where a digital signal is required to traverse a long distance. The invention allows connection of devices such as displays to a remote source such as a television receiver or computer. The invention uses a standard DVI interface connector of one gender connected to a custom connector card. The card connects the 24 output connections of the interface to a plurality of twisted pair cables. A similar card connects the twisted pair cables to a DVI connector of the opposite gender.

SCOPE OF THE INVENTION

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims, in which reference to an element in the singular is not intended to mean "one and only one" unless explicitly so stated, but rather "one or more". The inventions illustratively disclosed herein may be practiced without any element which is not specifically disclosed herein.

What is claimed is:

1. A system for linking a DVI producing device producing a DVI output to a peripheral device comprising:
   a connection means for connecting to the output of said DVI producing device to a DVI cable,
   a passive converter for converting a DVI input to a plurality of outputs,
   a plurality of cables comprised of a plurality of twisted pairs each having one end connected to each of said outputs of said converter,
   a second converter for converting the signal received from the other end of each of said cables into a DVI output,
   a second DVI cable for connecting the output of said second converter to a peripheral device, and
   a second connection means for connecting said cable to said peripheral device.

2. A system for linking a DVI producing device producing a DVI output to a peripheral device as in claim 1, wherein there are four pairs in each of said plurality of cables.

3. A system for linking a DVI producing device producing a DVI output to a peripheral device as in claim 1, wherein there are three of such twisted pair cables.

4. A system for linking a DVI producing device producing a DVI output to a peripheral device as in claim 1, wherein there are three of such twisted pair cables and they are category 5 cables.

5. A converter card for converting a 24-pin DVI signal into a plurality of signals suitable for conduction on a plurality of multi conductor cables comprising:
   a 24-pin DVI input connectable to a source of DVI signal,
   three outputs each having eight pins for connecting to multi conductor cables, and
   a plurality of connections connecting each one of said 24 pins to a single conductor in one of said multi conductor cables.

6. A converter card for converting a 24-pin DVI signal into a plurality of signals suitable for conduction on a plurality of multi conductor cables as in claim 5, wherein there are three such outputs each having eight pins.

7. A converter card for converting a 24-pin DVI signal into a plurality of signals suitable for conduction on a plurality of multi conductor cables as in claim 5, wherein said outputs are category 5.

8. A method for conducting a 24-conductor DVI signal to a distant location comprising the steps of, splitting the signal into a three eight conductor signals, and connecting each of said split signals into a plurality of conductors, and collecting each of said split signals into a single 24-conductor DVI signal, receiving said collected signal at said distant location.

9. A method for conducting a 24-conductor DVI signal to a distant location comprising the steps of, passively splitting the signal into a plurality of signals, and connecting each of said split signals into a plurality of conductors, and collecting each of said split signals from said plurality of conductors into a single 24-conductor DVI signal a plurality of twisted pairs in said multi conductor signal, receiving said collected signal at said distant location.

* * * * *